United States Patent [19]

Kowallik

[11] 4,100,710
[45] Jul. 18, 1978

[54] TONGUE-GROOVE CONNECTION

[75] Inventor: Josef Kowallik, Freudenberg, Fed. Rep. of Germany

[73] Assignee: Hoesch Werke Aktiengesellschaft, Dortmund, Fed. Rep. of Germany

[21] Appl. No.: 643,623

[22] Filed: Dec. 23, 1975

[30] Foreign Application Priority Data

Dec. 24, 1974 [DE] Fed. Rep. of Germany ....... 2461428

[51] Int. Cl.² .............................................. E04C 1/10
[52] U.S. Cl. .................................... 52/309.9; 52/595; 403/353
[58] Field of Search ........................ 403/381, 339, 353; 52/753 T, 753 J, 753 W, 403, 394, 539, 588, 595, 309.9

[56] References Cited

U.S. PATENT DOCUMENTS

| 1,575,842 | 3/1926 | Johnston ............................ 52/753 W |
| 2,896,271 | 7/1959 | Kloote et al. ...................... 52/753 W |
| 3,079,730 | 3/1963 | Donegan ............................ 52/753 T |
| 3,479,784 | 11/1969 | Mossagli ............................ 52/588 |
| 3,535,844 | 10/1970 | Glaros ............................ 52/309.9 X |
| 3,714,747 | 2/1973 | Carran ............................ 52/309.2 |

FOREIGN PATENT DOCUMENTS

30,943   1960   Finland ............................. 52/753 T

*Primary Examiner*—Andrew V. Kundrat
*Attorney, Agent, or Firm*—Walter Becker

[57] ABSTRACT

A tongue-groove connection which includes: a first member having an end face with a groove therein, and a second member having an end face with a part thereof forming a tongue, and engaging the groove of the first member while defining a gap therebetween. Each of the first and second members has cover layer means with a core layer therebetween, while a sealing band is sealingly interposed between the first and second members so as to seal the gap therebetween. The tongue-groove connection also comprises a screw connection by means of which the first member and due to the interlocking engagement of its groove with the tongue of the second member also the latter are connectable to a contruction onto which the tongue-groove connection is to be fastened. The tongue has a guiding surface which during the assembly of the tongue in the groove cooperates with an abutment edge on the groove forming first members for guiding the tongue into the groove. The width of the groove is less than the total width of the tongue in non-assembled condition of the latter.

8 Claims, 2 Drawing Figures

TONGUE-GROOVE CONNECTION

The present invention relates to a connecting element comprising two cover layers, preferably metallic cover layers, which are interconnected by means of a core layer of synthetic hard foam; for connection with the adjacent element, one longitudinal side of the connecting element is designed as a tongue whereas the other longitudinal side is designed as a groove. A sealing band is arranged between the tongue and groove; the longitudinal side which contains the groove is connectable by means of a screw connection to a lower structure.

With heretofore known connecting elements having the above mentioned tongue and groove connection, the sealing band is customarily arranged at the bottom of the groove, and the sealing is effected by displacement of the connecting element in the wall plane toward the already installed and connected adjacent connecting element while the end face of the tongue is pressed against the sealing band. To this end, in most instances, auxiliary means are necessary. Furthermore, already due to slight irregularities in the design of the groove, of the sealing band arrangement or of the pressing force, deviations from the intended sealing effect and a different gap width may be obtained which in case several connecting elements are involved may add up and in addition thereto may affect the appearance of the entire connection.

Furthermore, the individual cover layers have only relatively slightly profiled rims so that they have only a relatively low resistance against bending, bulging or buckling which fact, in case of fire, may bring about a bursting or splitting of the tongue and groove connection.

It is, therefore, an object of the present invention to so improve connecting elements with tongue and groove connection of the above referred to general character that it will be possible in a simple manner to obtain a highly satisfactory seal, even over a longer period of time, a precise assembly without requiring special auxiliary means, a better behavior and in particular a greater safety in case of fire.

This object and other objects and advantages of the invention will appear more clearly from the following specification in connection with the accompanying drawing in which.

Figure 1:
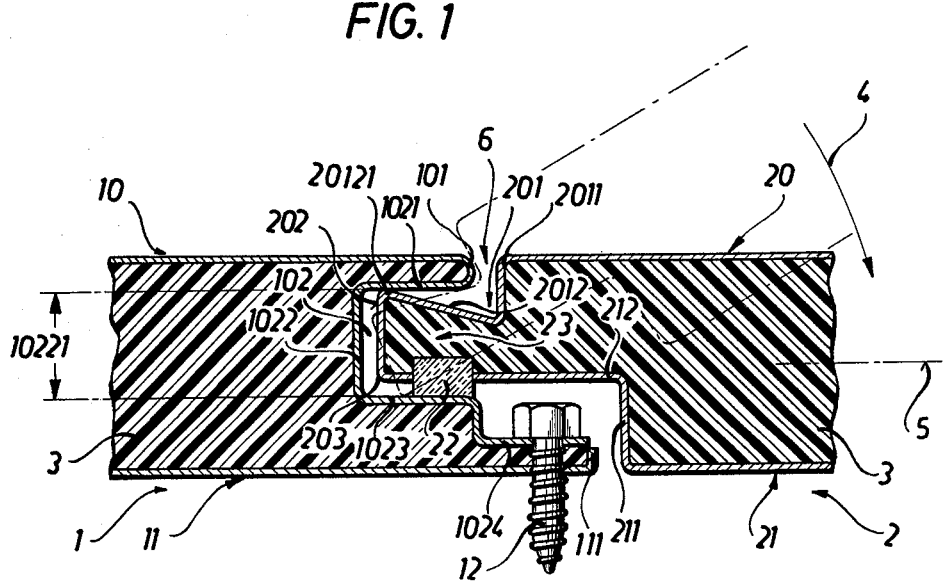
FIG. 1 illustrates a cross section of the connection of two interengaging connecting elements with the starting position of one connecting element indicated by dot-dash lines.

The connecting element according to the present invention is characterized primarily in that the tongue comprises primarily a rim of the outer cover layer and furthermore comprises on the inside the sealing band and on the outside a guiding surface. The connecting element according to the invention is furthermore characterized in that on its outside it has a guiding surface. The connecting element also provides a tongue formed of the other rim of the outer cover layer. The connecting element additionally comprises an abutment edge which when inwardly shifting or pivoting a connecting element cooperates with the guiding surface. The connecting element has a width which is less than the total thickness of the tongue in its unclamped condition. The tongue is provided with the sealing band. The connecting element according to the invention is also characterized by the fact that, by means of the screw connection, there are connectable to each other; the rim of the outer cover layer, which forms the groove and ends in a bearing or contact surface, the tongue which is clamped in the groove by means of the front edge and the sealing band, and the rim of the inner cover layer.

According to a further feature of the invention preferably the guiding surface of the tongue is formed by an inclined surface which is inclined from the front edge inwardly, and furthermore forms a vertical step.

For increasing the profile stiffness or rigidity, it is furthermore possible within the region of the screw connection to step the groove forming rim of the outer layer to form a bearing or contact surface. It would also be possible to provide an arrangement in which the bearing or contact surface is not stepped and in which the screw is countersunk.

Furthermore, in particular for purposes of obtaining an additional stiffness of the marginal region, an insert of synthetic material may be arranged between the bearing surface and the rim of the inner cover layer.

The rim of the inner cover layer of the tongue side is advantageously so profiled that it extends over the screw connection.

Referring now to the drawing in detail, each connecting element comprises an outer cover layer 10, 20 respectively, an inner cover layer 11, 21 respectively, and the core layer 3. In this connection it should be borne in mind that the parts designated with the reference numerals 10 and 20 consist of the same outer cover layer and that the different numbering has been selected to indicate that in one instance the outer cover layer relates to the rim on the groove side and in the other instance the rim on the tongue side is involved. Similar remarks also apply to the numbering of the inner cover layer 11 and 21 respectively. The outer cover layer 10 of the groove side 1 forms the abutment edge 101 and the groove 102 which is formed by the outer groove surface 1021, the groove bottom 1022 with the width 10221 and inner groove surface 1023, and ends in the set-off bearing surface 1024. The cover layers may consist of sheet metal.

The inner cover layer 11 of the groove side 1 is substantially plane and has its end 111 bent upwardly.

The screw 12 extends through the bearing surface 1024, the core layer 3 and the inner cover layer 11.

Figure 2:
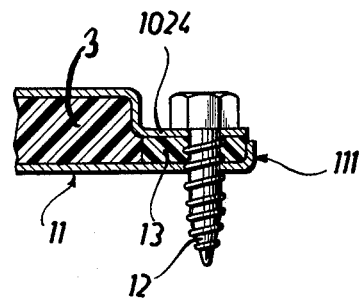
FIG. 2 is a fragmentary cross section of an embodiment according to the invention with an insert of synthetic material extending all the way through the respective connecting element.

According to the embodiment of FIG. 2, the screw 12 instead of being passed through the core layer 3 passes through the insert 13 of synthetic material, for instance polyvinyl chloride.

The outer cover layer 20 of the tongue side 2 forms a guiding surface 201 which comprises the step 2011 and the inclined surface 2012 and through the front edge 20121 merges with the tongue end face 202, and with the bent-off portion 203 extends to the sealing band 22 inserted into the core layer 3. Said sealing band may consist of profiled rubber or strips of foamed material.

The inner cover layer 21 forms a step 211 the extended rim 212 of which extends to the other side of the sealing band 22. Thus the tongue 23 is defined by the inclined surface 2012, the tongue end face 202, the angled-off portion 203, and the sealing band 22.

The assembly of the individual connecting elements will be evident from FIG. 1; the connecting element to be installed is changed from its dot-dash line position merely by pivoting in the direction of the arrow 4 to be moved into the wall plane 5 and thereby into its final position with regard to the already installed and connected adjacent connecting element. In this way a high pressure which is of the same magnitude for all tongue and groove connections will be obtained between the always precisely dimensioned groove 102 and the front edge 20121 and the sealing band 22 of tongue 23. Imasmuch as no force is exerted in the direction of the wall plane, furthermore an always practically uniform gap 6 is obtained between the step 2011 and the abutment edge 101; as a result thereof and also due to the covered-up screw connection, a pleasing appearance is obtained. On the other hand, in special instances, the connection according to the invention permits a certain displacement of the individual connecting elements with regard to each other in the direction toward the wall plane 5 without running the risk that the seal of the connection will be endangered by the high pressure.

The manufacture of the connecting element according to the invention may be effected in such a manner that the outer cover layer 10, 20 is placed with the plane surface thereof directed downwardly, thereupon the thus formed trough is sprayed with a still liquid synthetic foam 3 which is subsequently foamed as well as hardened and thus connects the outer cover layer 10, 20 with the inner cover layer 11, 21; the foam is fed from above.

As will be evident from the above, the present invention makes it possible that, during the assembly, the respective element can be precisely and positively guided into the wall plane; this occurs by sliding from a plane inclined to the wall plane, after the tongue has been introduced by permitting the guiding surface thereof to slide along the abutment edge of the groove of the already installed and connected adjacent connecting element.

In view of the relatively favorable lever arm ratio of the width of the connecting element to the width of the tongue and due to the key effect, a very high pressure can be exerted between the front edge of the tongue and groove and the sealing band and the groove. The pressed-on front edge of the tongue advantageously takes over the function of a pre-seal.

In view of the automatically occurring cooperation of abutment edge and guiding surface, and since no force is to be exerted in the wall plane, a uniform gap will be assured between two adjacent connecting elements.

The relatively strong profile of the rims of the outer cover layer results in a great stiffness or rigidity against bending toward the outside, while the inner cover layer can rest against a respective lower structure. As a result thereof, also in case of fire, a great safety against breaking open or splitting of the tongue and groove connection is obtained which otherwise might occur when the bending or bulging exceeds a certain magnitude. The stability of the connection is increased further by the fact that the tongue and groove rim which has a high stiffness or rigidity of its own are additionally held relative to each other by the screw connection according to the invention which has the advantage that it is not visible from the outside.

It is, of course, to be understood that the present invention is, by no means, limited to the specific showing in the drawing but also comprises any modifications within the scope of the appended claims.

What I claim is:

1. A tongue-groove connection which includes: a first member having an end face with a groove therein, a second member having an end face with a part thereof forming a tongue and engaging said groove, a sealing strip carried by said tongue intermediate the ends thereof and sealingly interposed between said tongue and groove, a screw means extending through a portion of said first member for connecting said first member to an under structure, said first member being at the outside thereof at the entrance to said groove provided with an abutment section, and said tongue being provided with a guiding surface for cooperation with said abutment section to aid the introduction of said tongue into said groove, the width of said groove being less than the total thickness of said tongue and sealing strip when the latter have not been introduced yet into said groove, each of said first and second members comprising a core layer of synthetic hard foam with oppositely located main surfaces and with side surfaces laterally thereof, each of said first and second members also comprising two cover layers respectively covering said main surfaces, one of the ends of said groove having an extension which includes one of said main surfaces, and one of said cover layers for the other one of said main surfaces of said first member forming the side and bottom surfaces of said groove and also covering that side of said extension which faces away from said one of said main surfaces.

2. A tongue-groove connection according to claim 1, in which that one of said main surfaces which is included by said extension is formed by one of said two cover layers of said first member.

3. A tongue-groove connection according to claim 1, in which said extension is covered on opposite sides by a portion of both cover layers of said first member.

4. A tongue-groove connection according to claim 3, in which that portion of the cover layer which is located within the region of said screw means and inwardly of the adjacent main surface of said first member is connected to the cover layer covering said groove by a bent-off cover layer section.

5. A tongue-groove connection according to claim 1, in which each of the main surfaces of said second member is covered by a cover layer, and in which one of said last mentioned two cover layers also covers said tongue, and in which the other one of said last mentioned two cover layers has an extension extending inwardly from the adjacent main surfaces and around said screw means.

6. A tongue-groove connection according to claim 1, in which said cover layers are of sheet metal.

7. A tongue-groove connection which includes in combination: a first member having an end face with a groove therein, a second member having an end face with a part thereof forming a tongue and engaging said groove, a sealing strip carried by said tongue intermediate the ends thereof and sealingly interposed between said tongue and groove, screw means extending through a portion of said first member for connecting said first member to an under structure, said first member being at the outside thereof at the entrance to said groove provided with an abutment section, and said tongue being provided with a guiding surface for cooperation with said abutment section to aid the introduction of said tongue into said groove, the width of said groove being less than the total thickness of said tongue and sealing when the latter have not been introduced yet into said groove, each of said first and second members comprising a core layer of synthetic hard foam with oppositely located main surfaces and with side surfaces laterally thereof, each of said first and second members also comprising two cover layers respectively covering said main surfaces, the tongue of said second member is covered by an extension of at least one of the cover layers covering the main surfaces of said second member, the guiding surface of said tongue comprising an inclined surface inclined away from said groove and inwardly, from that front edge of said tongue which is remote from said sealing strip, said inclined surface being continued by a section connecting the most inwardly located area of said inclined surface with the nearest area of the adjacent cover layer.

8. A tongue-groove connection which includes: a first member having an end face with a groove therein, a second member having an end face with a part thereof forming a tongue and engaging said groove, a sealing strip carried by said tongue intermediate the ends thereof and sealingly interposed between said tongue and groove, screw means extending through a portion of said first member for connecting said first member to an under structure, said first member being at the outside thereof at the entrance to said groove provided with an abutment section, and said tongue being provided with a guiding surface for cooperation with said abutment section to aid the introduction of said tongue into said groove, the width of said groove being less than the total thickness of said tongue and sealing strip when the latter have not been introduced yet into said groove, each of said first and second members comprising a core layer of synthetic hard foam with oppositely located main surfaces and with side surfaces laterally thereof, each of said first and second members also comprising two cover layers respectively covering said main surfaces, each of the main surfaces of said first member being covered by a cover layer, one of said last mentioned two cover layers also covering said groove and having an extension extending to the area of said screw means, the other cover layer likewise extending into the area of said screw means, an insert of synthetic material being provided between those portions of said two cover layers which extend into the area of said screw means, and said screw means extending through said insert and the adjacent portions of said two cover layers.

* * * * *